(12) United States Patent
Kweon et al.

(10) Patent No.: US 6,753,111 B2
(45) Date of Patent: Jun. 22, 2004

(54) POSITIVE ACTIVE MATERIAL FOR RECHARGEABLE LITHIUM BATTERIES AND METHOD FOR PREPARING SAME

(75) Inventors: Ho-Jin Kweon, Cheonan (KR); Jun-Won Suh, Cheonan (KR); Won-Il Jung, Cheonan (KR)

(73) Assignee: Samsung SDI Co., Ltd., Suwon (KR)

(*) Notice: Subject to any disclaimer, the term of this patent is extended or adjusted under 35 U.S.C. 154(b) by 208 days.

(21) Appl. No.: 09/964,263

(22) Filed: Sep. 25, 2001

(65) Prior Publication Data

US 2002/0110736 A1 Aug. 15, 2002

(30) Foreign Application Priority Data

Sep. 25, 2000 (KR) .......................... 2000-56246
Jun. 26, 2001 (KR) .......................... 2001-0036767

(51) Int. Cl.$^7$ .............................................. H01M 4/62
(52) U.S. Cl. ................................ 429/231.95; 429/231.1
(58) Field of Search .......................... 429/231.95, 218.1, 429/137, 224, 231.8; 427/126.1, 337; 423/599; 29/623.5

(56) References Cited

U.S. PATENT DOCUMENTS

| 4,959,282 A | 9/1990 | Dahn et al. |
| 5,705,291 A | * 1/1998 | Amatucci et al. ........... 429/137 |
| 5,783,328 A | 7/1998 | Wang |
| 5,939,043 A | 8/1999 | Yahagi |
| 6,558,844 B2 | 5/2003 | Howard, Jr. et al. |
| 2002/0071990 A1 | 6/2002 | Kweon et al. |

FOREIGN PATENT DOCUMENTS

| JP | 09-055210 | 2/1997 |
| JP | 11-016566 | 1/1999 |

OTHER PUBLICATIONS

U.S. patent application Ser. No. 09/963,872, Ho–Jin Kweon, et al.
U.S. patent application Ser. No. 09/966,572, Ho–Jin Kweon, et al.

* cited by examiner

Primary Examiner—Randy Gulakowski
Assistant Examiner—Monique Wills
(74) Attorney, Agent, or Firm—Christie, Parker & Hale, LLP

(57) ABSTRACT

Provided are a positive active material and a method of preparing for the same. The positive active material comprises a core and a surface-treatment layer on the core. The core includes at least one lithiated compound, and the surface-treatment layer includes at least one coating element-included oxide. The lithiated compound includes a secondary particle of which average particle size is larger than or equal to 1 μm and less than 10 μm. The secondary particle is formed of an agglomeration of small primary particles of an average size of 1 to 3 μm in diameter. The positive active material is prepared by coating the lithiated compound with an organic solution or an aqueous solution including a coating-element source and heat-treating the coated compound.

17 Claims, 5 Drawing Sheets

POSITIVE ACTIVE MATERIAL FOR RECHARGEABLE LITHIUM BATTERIES AND METHOD FOR PREPARING SAME

CROSS REFERENCE TO RELATED APPLICATION

This application is based on Korea Patent Application Nos. 2000-56246 filed on Sep. 25, 2000, and 2001-36767 filed on Jun. 26, 2001 in the Korean Industrial Property Office, the contents of which are incorporated herein by reference.

FIELD OF THE INVENTION

The present invention relates to a positive active material for a rechargeable lithium battery and a method for preparing the same, and more particularly, to a positive active material for a rechargeable lithium battery having improved thermal safety, and a method for preparing the same.

BACKGROUND OF THE INVENTION

Rechargeable lithium batteries use a material from or into which lithium ions are deintercalated or intercalated for positive and negative active materials. For an electrolyte, an organic solvent or polymer is used. A rechargeable lithium battery produces electric energy as a result of changes in the chemical potentials of the active materials during the intercalation and deintercalation reactions of lithium ions.

For the negative active material in a rechargeable lithium battery, metallic lithium was used in the early days of development. Recently, however, carbon materials, which intercalate lithium ions reversibly, are extensively used instead of metallic lithium due to problems of high reactivity toward the electrolyte and dendrite formation of the metallic lithium. With the use of carbon-based active materials, the potential safety problems which are associated with the metallic lithium can be prevented while achieving relatively high energy density, as well as a much improved cycle life. In particular, boron may be added to carbonaceous materials to produce boron-coated graphite (BOC) in order to increase the capacity of the carbonaceous materials.

For the positive active material in the rechargeable lithium battery, chalcogenide compounds into or from which lithium ions are intercalated or deintercalated are used. Typical examples include $LiCoO_2$, $LiNiO_2$, $LiNi_{1-x}Co_xO_2$ ($0<x<1$), and $LiMnO_2$. Manganese-based materials such as $LiMn_2O_4$ and $LiMnO_2$ are the easiest to prepare, are less expensive than the other materials, and are environmentally friendly. However, manganese-based materials have relatively low capacity. $LiNiO_2$ is inexpensive and has a high capacity, but is difficult to prepare in the desired structure and is relatively less stable in the charged state causing a battery safety problem. $LiCoO_2$ is relatively expensive, but widely used as it has good electrical conductivity and high cell voltage. Most commercially available rechargeable lithium batteries (at least about 95%) use $LiCoO_2$ as the positive active material.

Although $LiCoO_2$ exhibits good cycle life characteristics and good flat discharge profiles, there are still demands to improve electrochemical properties such as good cycle life and high power density.

One way to satisfy such a demand is to substitute a part of the Co from $LiCoO_2$ with other metals. Sony studied $Li_xCo_{1-y}Al_yO_2$ by doping about 1 to 5 percent by weight of $Al_2O_3$ into $LiCoO_2$. A&TB (Asahi & Toshiba Battery Co.) studied a Sn-doped Co-based active material by substituting a part of Co from $LiCoO_2$ with Sn.

As electronic products become smaller in size and lighter in weight, a lithium rechargeable having improving electrochemical properties such as high capacity and long cycle life are desired.

SUMMARY OF THE INVENTION

It is an object of the present invention to provide a positive active material for a rechargeable lithium battery cell exhibiting longer cycle life characteristics and enhanced discharge voltage.

It is another object of the present invention to provide a method for preparing the same.

In order to achieve these objects, the present invention provides a positive active material for a rechargeable lithium battery cell in which the active material includes a core including a lithiated compound and a surface-treatment layer formed on the core. The surface-treatment layer includes a core element-included oxide, or a core-element-included hydroxide, oxyhydroxide, oxycarbonate, hydroxycarbonate or a mixture thereof. The lithiated compound may be made of secondary particles of an average size larger than or equal to 1 $\mu$m and smaller than 10 $\mu$m in diameter. The secondary particles are made of an agglomeration of small primary particles of an average size of approximately 1 to 3 $\mu$m in diameter.

The present invention also provides a method for preparing the same. In the method, the lithiated compound is coated with an organic solution or an aqueous solution including a coating-element source, and the coated lithiated compound is heat-treated.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE INVENTION

Figure 1A:
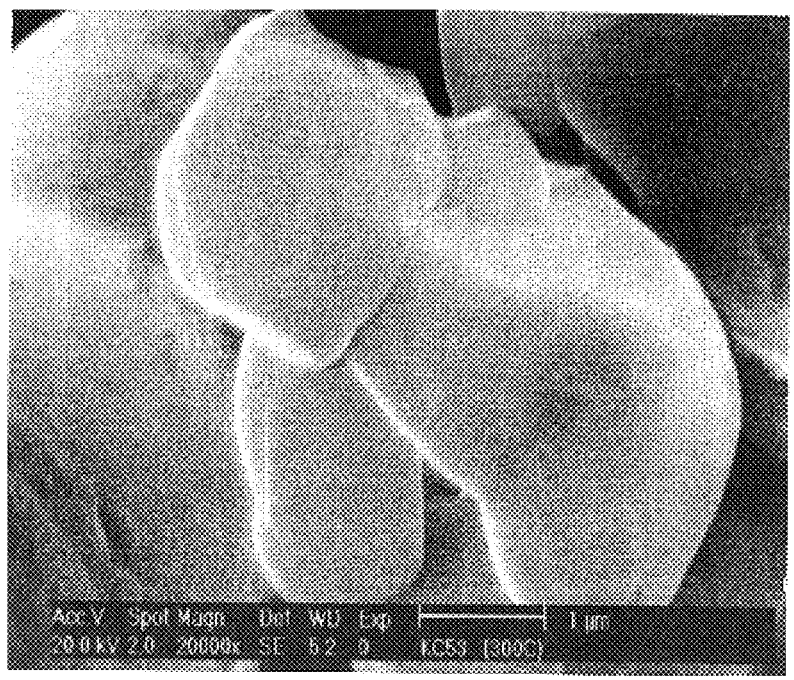
FIGS. 1a and 1b are scanning electronic microscope (SEM) views showing a surface of positive active material particles according to Example 1 of the present invention and Control 1.

A positive active material for a rechargeable lithium battery of the present invention includes a core and a surface-treatment layer on the core. The core includes at least one lithiated compound. The surface-treatment layer may include at least one coating-element-included oxide. Alternatively, the surface-treatment layer may include at least one coating-element-included hydroxide, oxyhydroxide, oxycarbonate, hydroxycarbonate or a mixture thereof.

The lithiated compound includes a secondary particle having an average particle size of larger than or equal to 1 $\mu$m and less than 10 $\mu$m in diameter. The secondary particle is made of an agglomeration of primary particles having an average particle size ranging of 1 $\mu$m to 3 $\mu$m in diameter. In the present invention, the primary particle refers to a small unit particle, and the secondary particle refers to an agglomerated mass of more than one primary particle.

The average particle size of the secondary particles is critical for determining the battery performance rather than that of the primary particles. When the average particle size of the secondary particles is less than 1 $\mu$m, the thermal safety of a battery with the positive active material is poor due to the high reaction rate of the material with the electrolyte causing a safety problem with the battery. When the secondary particle is greater than 10 $\mu$m, the capacity of the battery at a high rate becomes poor.

It is preferable that the positive active material is selected from a group consisting of one or more compounds represented by the formulas 1 to 11. It is more preferable that the compounds include one or more of lithium-cobalt chalcogenide, lithium-manganese chalcogenide, lithium-nickel chalcogenide, and lithium-nickel-manganese chalcogenide.

   $Li_xMn_{1-y}M'_yA_2$   (1)

   $Li_xMn_{1-y}M'_yO_{2-z}X_z$   (2)

   $Li_xMn_2O_{4-z}A_z$   (3)

   $Li_xMn_{2-y}M'_yA_4$   (4)

   $Li_xM_{1-y}M''_yA_2$   (5)

   $Li_xMO_{2-z}A_z$   (6)

   $Li_xNi_{1-y}Co_yO_{2-z}A_z$   (7)

   $Li_xNi_{1-y-z}Co_yM''_zA_\alpha$   (8)

   $Li_xNi_{1-y-z}Co_yM''_zO_{2-\alpha}X_\alpha$   (9)

   $Li_xNi_{1-y-z}Mn_yM'_zA_\alpha$   (10)

   $Li_xNi_{1-y-z}Mn_yM'_zO_{2-\alpha}X_\alpha$   (11)

wherein, $0.95 \leq x \leq 1.1, 0 \leq y \leq 0.5, 0 \leq z \leq 0.5, 0 < \alpha \leq 2$, M is Ni or Co, M' is at least one element selected from the group consisting of Al, Ni, Co, Cr, Fe, Mg, Sr, V, Sc, Y, La, Ce, Pr, Nd, Pm, Sm, Eu, Gd, Tb, Dy, Ho, Er, Tm, Yb, Lu, Ac, Th, and Pa, M" is at least one element selected from the group consisting of Al, Cr, Mn, Fe, Mg, Sr, V, Sc, Y, La, Ce, Pr, Nd, Pm, Sm, Eu, Gd, Tb, Dy, Ho, Er, Tm, Yb, Lu, Ac, Th, and Pa, A is selected from the group consisting of O, F, S and P, and X is selected from the group consisting of F, S and P.

The coating element in the coating material source may be any element which is capable of being dissolved in organic solvents or water. Examples are Mg, Al, Co, K, Na, Ca, Si, Ti, V, Sn, Ge, Ga, B, As, Zr, or any mixture thereof.

The coating element content of the one or more surface-treatment layers preferably ranges from $2 \times 10^{-5}$ to 1 wt % based on the weight of the positive active material, and more preferably ranging from 0.001 to 1 wt %. The positive active material of the present invention shows good thermal safety as shown by the elevated exothermic reaction temperature as well as the reduced amount of heat evolved in DSC experiments compared with the corresponding uncoated active material.

According to one example of the present invention, the core includes lithium-cobalt chalcogenide compounds and the surface-treatment layer includes $Al_2O_3$. According to another example of the present invention, the core includes a lithium-manganese or lithium-cobalt chalcogenide compound and the surface-treatment layer includes a B-included oxide.

The preparation of the active material of the present invention will be illustrated below in more detail.

A lithiated compound is coated with an organic or an aqueous solution including a coating-element source (hereinafter referred to as "a coating solution"). The coating solution is obtained by dissolving the coating-element source in an organic solvent or water, and preferably refluxing the resulting mixture. The coating-element source includes a coating element or a coating-element-included alkoxide, salt or oxide. Suitable coating-element sources may be chosen from the coating element and the coating-element-included alkoxide, salt and oxide according to the type of the solvent, which is well known to one skilled in the related arts. For example, if an organic solvent is used for the solvent, then for the coating element, a coating-element-included alkoxide, salt or oxide may be used for the coating-element source. If water is used for the solvent, then only the coating-element-included salt or oxide may be used for the coating material solution. For example, a boron solution may be prepared by dissolving $HB(OH)_2$, $B_2O_3$ or $H_3BO_3$ in either an organic solvent or water.

The coating element in the coating material source may be any element which is capable of being dissolved in organic solvents or water. Examples are Mg, Al, Co, K, Na, Ca, Si, Ti, V, Sn, Ge, Ga, B, As, Zr, or any mixture thereof.

Useful organic solvents include hexane, chloroform, tetrahydrofuran, ether, methylene chloride, acetone, or alcohols such as methanol, ethanol or isopropanol.

The exemplary organic solution is a coating element-included alkoxide solution. The alkoxide solution may be prepared by dissolving the coating element in an alcohol such as methanol, ethanol or isopropanol, and refluxing them, or by dissolving a coating element-included alkoxide such as methoxide, ethoxide or isopropoxide in alcohol. For example, tetraethylorthosilicate solution is prepared by dissolving silicate in ethanol. The organic solution or aqueous solution may also be available through commercial purchase.

Useful salts or oxides also include a form of vanadate, such as ammonium vanadate ($NH_4(VO)_3$) or vanadium oxide ($V_2O_5$).

The concentration of coating element source in the coating solution may be 0.1 to 50 wt %, based on the coating solution, and preferably 1 to 20 wt %. When the concentration thereof is below 0.1 wt %, the effect obtained by coating the solution onto the lithiated compound may not be sufficient. When the concentration of coating element source is more than 50 wt %, the resultant coating layer may become undesirably thick.

The lithiated compound includes at least one secondary particle. The average particle size of the secondary particle is larger than or equal to 1 μm and less than 10 μm, and the secondary particle is made of an agglomeration of primary particles. The average particle size of the primary particles ranges from 1 to 3 μm.

The coating process may be performed by a sputtering method, a chemical vapor deposition (CVD) method, an impregnation method such as dip coating, or by using any other general-purpose coating techniques. Any other coating techniques, if available and applicable, may be as effective as the methods described herein. A conventional method of the coating process involves an impregnation step of the lithiated compound in the solution. The impregnation method includes steps in which the lithiated material is mixed with the coating solution (mixing step), and the resulting wet lithiated material is then separated from the solution (solvent-removing step) to remove excess solution.

The wet solution-coated lithiated compound may be dried from room temperature to about 200° C. for approximately 1 to 24 hours. The dried material includes a core including a lithiated compound and a hydroxide, oxyhydroxide, oxycarbonate, hydroxycarbonate or a mixture thereof. The resulting material may be used for a positive active material.

Alternatively, the coating process may be a one-shot process where a mixing step, a solvent-removing step and a drying step take place in a single process vessel. This one-shot process is simple, thereby reducing the production cost and making a uniform surface-treatment layer on a core.

This one-shot coating process involves adding the coating solution to the compound to be coated in a mixing-and-drying vessel. The mixture is mixed well to coat the compound with the solution, while the compound is still agitated well for mixing, making the process a single continuous step to make the dry coated compound.

The one-shot process will be illustrated below in more detail.

The coating solution and the lithiated compound are put into a mixer, and the temperature of the mixer is raised while the contents are being mixed (agitated). Additionally, a flushing gas may be introduced into the mixer. The flushing gas helps to facilitate evaporation of the solvent in the coating solution and to purge impure gases that are present in the mixer. The flushing gas may include $CO_2$ and a moisture-free inert gas, such as nitrogen gas or argon gas. Alternatively, the one-shot process may be performed under vacuum rather than using the flushing gas.

The mixer may be any type of mixer as long as the lithiated compound and the coating solution are well mixed and the temperature of the mixer can be raised during the mixing process.

In the coating process, the lithiated compound is coated with the coating solution in the mixer, and the solvent of the coating solution may be evaporated as the process temperature is increased while the process mixture is being stirred continuously without stopping. Therefore, the transfer of the solution-coated wet compound to another vessel (a tray) and drying step in the tray can be combined into a single continuous process ("one-shot") in a single vessel.

If the one-shot process is performed, the drying step may be simultaneously performed with the coating step, thus eliminating the requirement of an additional drying step.

The resulting powder of the lithiated compound is heat-treated at the temperature ranging from 300 to 800° C. for 1 to 15 hours. In order to prepare a more uniform oxide-coated positive active material, the heat-treating process may be preferably performed under flowing dry air or oxygen. When the heat-treatment temperature is lower than 300° C., good lithium ion-conducting coating may not be formed resulting in a failure in facilitation of free movement of the lithium ions through the interface of the active material and electrolyte. When the heat-treatment temperature is higher than 800° C., a poor lithium ion-conduction coating is formed at the surface of the active material. The organic or aqueous solution of the coating material source changes into a coating element-included oxide through the heat-treating process, and the positive active material coated with coating element-oxide (surface treatment layer) may be prepared. The lithiated compound includes secondary particles having average particle sizes larger than or equal to 1 μm and less than 10 μm. Each secondary particle is made of an agglomeration of primary particles of an average particle size ranging from 1 to 3 μm.

The surface-treatment layer on the active material core includes elements from the coating solution as well as elements originating from the lithiated compound. For example, when $LiCoO_2$ is coated with aluminum alkoxide solution followed by heat-treatment to produce a coated positive active material, the coating layer may include not only aluminum oxide but also cobalt-aluminum oxide as well.

The coating and heat-treating process (hereinafter referred to a "treating process") may be performed using a coating solution which includes more than one coating element, so that the coated layer may include more than one coating element. Alternatively, the treating process may be first performed with the coating solution including at least one coating element, and then an additional treating process may be further performed with another coating solution including at least another coating element that is different from the one of the first coating solution, resulting in a double-layer coating on the lithiated compound. The treating process may be performed three or more times with various coating solutions including at least one coating element in each solution so that the lithiated compound may be coated with triple layers or multiple layers of various oxides.

The lithiated compound may contain secondary particles which are made by an agglomeration of commercially-available primary particles with an average diameter of 1 to 3 μm. Alternatively, the lithiated compound may include secondary particles which are made by an agglomeration of any type of primary particles with an average diameter of 1 to 3 μm, which is prepared by the following procedure and sieved.

Lithium sources are mixed with metal sources in a desired ratio. The lithium source may be any material known in the related art, some of which include lithium nitrate, lithium acetate, and lithium hydroxide. For the metal sources, manganese sources, cobalt sources, nickel sources, and/or nickel-manganese sources may be used. Typical examples of the manganese sources are manganese acetate and manganese dioxide. Typical examples of the cobalt sources are cobalt oxide, cobalt nitrate and cobalt carbonate, whereas typical examples of the nickel sources are nickel hydroxide, nickel nitrate, and nickel acetate. The nickel-manganese sources may be produced by co-precipitating nickel and manganese salts. Fluoride sources, sulfur sources and/or phosphorous sources may be further used together with the manganese sources, cobalt sources, nickel sources or nickel-manganese sources. The fluoride sources may be manganese fluoride or lithium fluoride and the sulfur sources may be manganese sulfide or lithium sulfide. The phosphorous source may be $H_3PO_4$. Note that the above list of manganese, cobalt, nickel, nickel-manganese, manganese fluoride, lithium fluoride, sulfur and phosphorus sources is not an exhaustive list.

In order to facilitate the reaction of the lithium sources and the metal sources, a small amount of solvent may be added to the mixture. The solvent may be ethanol, methanol, water or acetone. The mixture may then be ground in a mortar thoroughly.

The resulting mixture is heat-treated (the first heat-treating step) at about 400 to 600° C. for 1 to 5 hours to produce a semi-crystalline positive active material precursor powder. Although other temperatures are possible, if the first heat-treating step temperature is less than 400° C., the metal sources may not react completely with the lithium sources. Thereafter, the first heat-treated active material precursor powder is remixed thoroughly to distribute the lithium sources uniformly.

The semi-crystalline precursor powder is heat-treated (the second heat-treating step) again at about 700 to 900° C. for about 10 to 15 hours to produce a crystalline positive active material. As described above, if the first heat-treating step temperature is less than 400° C., the lithium sources may not react completely with the metal sources. If the second heat-treating step temperature is less than 700° C., it may be difficult to form a crystalline material. The heating step may be performed by increasing the temperature at a rate of 1 to 5° C./min under dry air. The mixture is allowed to stand at the first and second heat-treating temperatures for predetermined lengths of time, and then the mixture is cooled passively. Using this process, a desired particulate formed of a compound selected from the group consisting of the compounds represented by formulae 1 to 11 may be prepared.

The secondary particles having an average particle size of larger than or equal to 1 $\mu p$ and less than 10 $\mu m$ may be prepared by an agglomeration of primary particles having an average particle size of 1 to 3 $\mu m$.

The following examples illustrate the present invention in further detail, but the present invention is not limited by these examples.

EXAMPLE 1

Al-isopropoxide powder was dissolved in ethanol to prepare a 5% Al-isopropoxide solution.

100 g of $LiCoO_2$ powder was added to the Al-isopropoxide solution followed by mixing them for about 10 minutes to coat the powder with the solution. The $LiCoO_2$ powder had an average particle size of about 5 $\mu M$. These powder particles were made of an agglomeration of smaller particles of an average particle size of 1 to 3 $\mu m$. The wet mixture was allowed to stand for about 30 minutes for the powder to settle down followed by removal of excess supernatant solution.

The resulting solution-wet powder was heat-treated at 500° C. for 10 hours under flowing dry air by increasing the temperature at a rate of 3° C./min. The heat-treated material was cooled in the furnace to obtain a positive active material coated with an aluminum oxide layer.

The prepared positive active material, a carbon conductive agent and a polyvinylidene fluoride binder were weighed in a weight ratio of 94:3:3 and were mixed in N-methyl pyrrolidone solvent to form a positive active material slurry. The positive active material slurry was cast on an Al foil, followed by drying and compressing the cast film to make a positive electrode.

A mesocarbon fiber and a polyvinylidene fluoride binder were mixed in a weight ratio of 96:4 in N-methyl pyrrolidone solvent to prepare a negative active material slurry. The negative active material slurry was cast on a Cu foil, followed by drying and compressing the cast film to make a negative electrode.

Using the positive and the negative electrodes, a prismatic lithium-ion cell was fabricated using a commonly used technique. For an electrolyte, 1 M $LiPF_6$ solution of ethylene carbonate and dimethyl carbonate (1:1 in the volume ratio) was used.

EXAMPLE 2

A prismatic lithium-ion cell was fabricated by the same procedure as in Example 1, except that the heat-treatment was performed at 300° C. instead of at 500° C.

EXAMPLE 3

A prismatic lithium-ion cell was fabricated by the same procedure as in Example 1, except that the heat-treatment was performed at 700° C. instead of at 500° C.

EXAMPLE 4

A prismatic lithium-ion cell was fabricated by the same procedure as in Example 1, except that a 5% of aluminum nitrate solution prepared by dissolving $Al(NO_3)_3$ in water was used instead of the 5% Al-isopropoxide solution.

EXAMPLE 5

A prismatic lithium-ion cell was fabricated by the same procedure as in Example 1, except that the heat-treatment was performed at 300° C. instead of at 500° C., and except that a 5% of aluminum nitrate solution prepared by dissolving $Al(NO_3)_3$ in water was used instead of the 5% Al-isopropoxide solution.

EXAMPLE 6

A prismatic lithium-ion cell was fabricated by the same procedure as in Example 1, except that the heat-treatment was performed at 700° C. instead of at 500° C., and except that a 5% of aluminum nitrate solution prepared by dissolving $Al(NO_3)_3$ in water was used instead of the 5% Al-isopropoxide solution.

Control 1

A prismatic lithium-ion cell was fabricated by the same procedure as in Example 1, except that the $LiCoO_2$ powder was not coated with the Al-isopropoxide solution.

COMPARATIVE EXAMPLE 1

A prismatic lithium-ion cell was fabricated by the same procedure as in Example 1, except that the $LiCoO_2$ powder having an average particle size of 10 $\mu m$ in diameter was used.

COMPARATIVE EXAMPLE 2

A prismatic lithium-ion cell was fabricated by the same procedure as in Comparative Example 1, except that the $LiCoO_2$ macro powder was not coated with Al-isopropoxide solution.

Figure 1B:
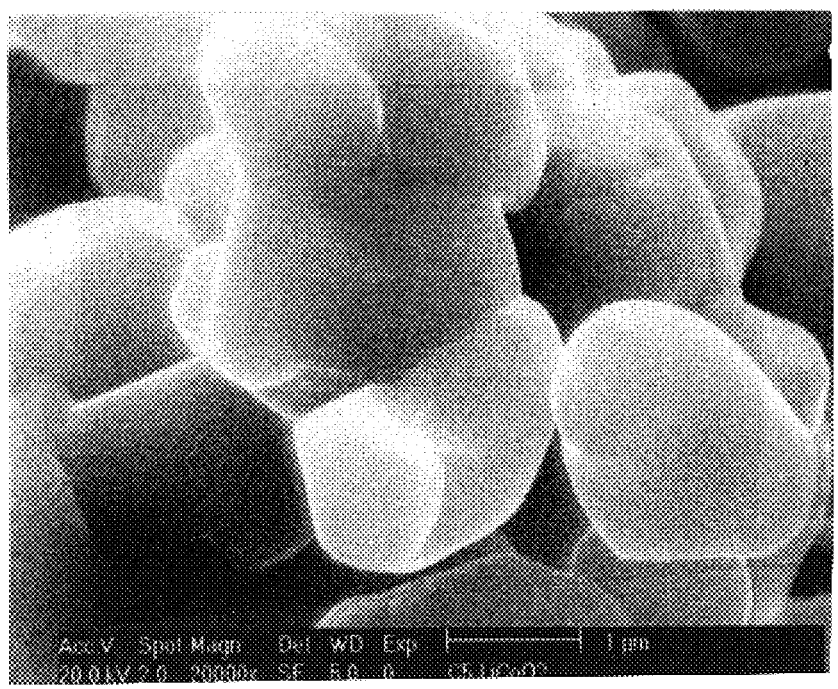
Figure 2A:
FIGS. 2a and 2b are SEM views showing a surface of positive active material particles according to Comparative Example 1 and Comparative Example 2.
Figure 2B:
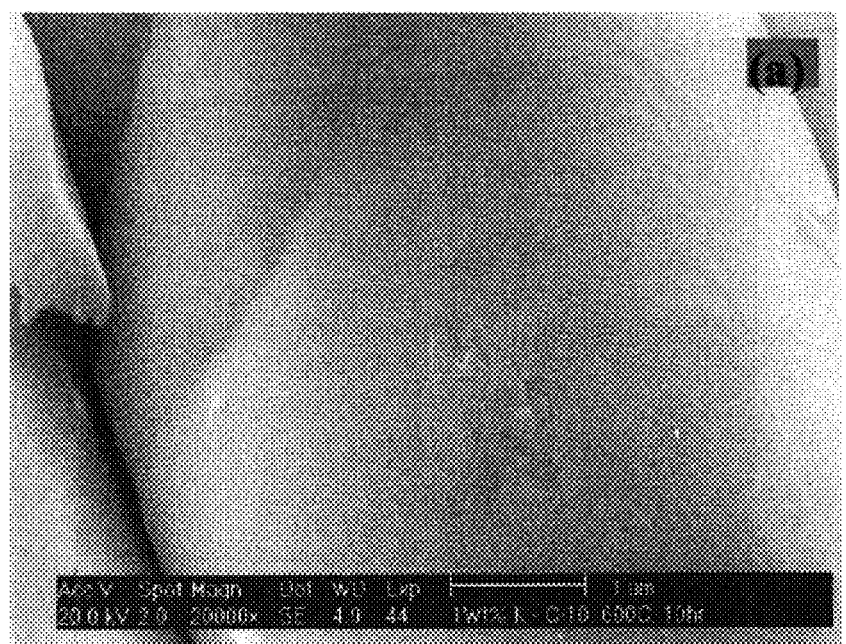

FIG. 1a and FIG. 1b show scanning electronic microscope (SEM) views of positive active materials according to Example 1 and Control 1, respectively. In addition, FIG. 2a and FIG. 2b show SEM views of positive active materials according to Comparative Example 1 and Comparative Example 2, respectively. As shown FIGS. 1a, 1b, 2a and 2b, the positive active materials of Example 1 and Control 1 were made of an aggregate of multiple small particles, while the materials of Comparative Examples 1 and 2 were made of large single particles.

Figure 3:
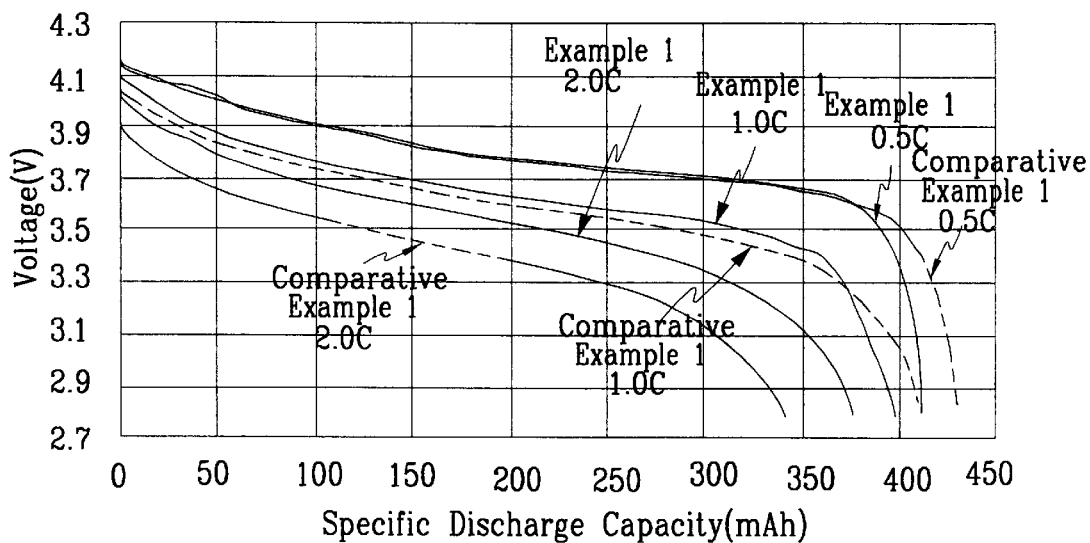
FIG. 3 is a graph showing the discharge capacity of positive active materials according to Example 1 of the present invention and Comparative Example 1.
Figure 4:
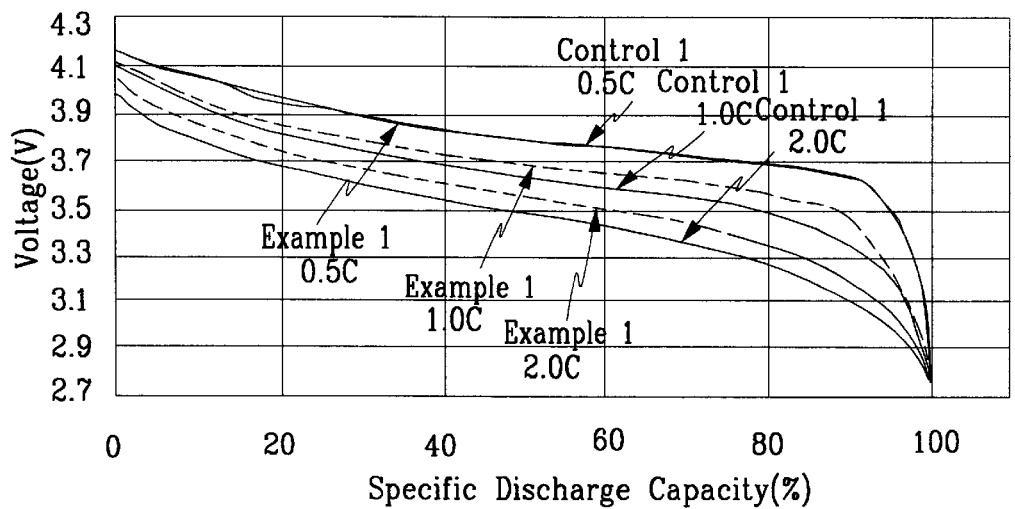
FIG. 4 is a graph showing the discharge capacity of positive active materials according to Example 1 of the present invention and Control 1.

The prismatic cells according to Example 1, Control 1, and Comparative Examples 1 and 2 were charged and discharged in a voltage range of 4.2 V to 2.75 V. The charge was performed at 0.2 C, and the discharge was performed at 0.5 C, 1 C, and 2 C rates. The formation of the cells was performed at 0.2 C. The results of the charge and discharge experiments are shown in FIGS. 3 and 4. FIG. 3 shows the charge and discharge results of Example 1 and Comparative Example 1, and FIG. 4 shows the charge and discharge results of Example 1 and Control 1. The discharge capacity in FIG. 4 is defined as the percent values of the observed capacity to the maximum discharge capacity.

It is shown in FIG. 3 that the discharge characteristics depend on the particle size of the $LiCoO_2$. Namely, the discharge potentials of the active materials of Example 1 and Comparative Example 1, which are coated with the same solution, are different. Although the same coating solution was used in Example 1 and Comparative Example 1, the discharge potential of Example 1 at high rates (1.0 C and 2.0 C) is higher than that of Comparative Example 1. This result is believed to be due to the particle structure of Example 1 being different from that of Comparative Example 1 as shown in FIGS. 1a, 1b, 2a and 2b. The positive active material of Example 1 had an average particle size of 5 μm in diameter. These secondary particles were made of an agglomeration of smaller primary particles. However, the active material of Comparative Example 1 is made of primary unit particles having an average size of 10 μm in diameter.

FIG. 4 shows that the $LiCoO_2$ active material with the aluminum oxide coating gives improved discharge characteristics at high rates (Example 1) over the corresponding active material without the aluminum oxide coating (Control 1).

These results indicate that discharge characteristics are improved as the particle size becomes smaller and when the surface-treatment is performed on the active material.

EXAMPLE 7

A prismatic lithium-ion cell was fabricated by the same procedure as in Example 1, except that a 10% boron ethoxide solution was used instead of the 5% Al-isopropoxide solution.

EXAMPLE 8

A prismatic lithium-ion cell was fabricated by the same procedure as in Example 1, except that a 10% boron ethoxide solution was used instead of the 5% Al-isopropoxide solution, and except that the heat-treatment was performed at 300° C. instead of at 500° C.

EXAMPLE 9

A prismatic lithium-ion cell was fabricated by the same procedure as in Example 1, except that a 10% boron ethoxide solution was used instead of the 5% Al-isopropoxide solution, and except that the heat-treatment was performed at 700° C. instead of at 500° C.

Twenty prismatic cells using the positive active materials according to Examples 7 to 9 and Comparative Example 1 were tested for safety categories of burning, heat exposure, and overcharge. The burning test results are shown as the percentage of cells which burst when heated with a burner. The heat exposure test results are shown as the duration of time at 150° C. before the cell burst. The overcharge test results are shown as the percentage of the cells which leaked when they are overcharged at 1 C rate. The results are summarized in Table 1.

TABLE 1

|  | Comparative Example 1 | Example 7 | Example 8 | Example 9 |
| --- | --- | --- | --- | --- |
| Burst percentage on burning | 90% | 0% | 0% | 0% |
| Average time-to-burst (Heat exposure) | 11 min. | 15 min. | 12 min. | 20 min. |
| Leak Percentage (1C-overcharge) | 100% | 10% | 30% | 0% |

EXAMPLE 10

A positive active material having a boron oxide layer was prepared as in Example 1, except that $Li_{1.03}Ni_{0.69}Mn_{0.19}Co_{0.1}Al_{0.07}Mg_{0.07}O_2$ powder with an average particle size of 5 μm coated with a 1% boron ethoxide solution was used, and the heat-treatment was performed at 700° C. instead of at 500° C. These powder particles were made of an agglomeration of smaller particles of an average particle size of 1 to 3 μm.

The positive active material, a carbon conductive agent, and a polyvinylidene fluoride binder were mixed in a weight ratio of 94:3:3 in N-methyl pyrrolidone solvent in order to make a positive active material slurry. The slurry was cast on an Al foil, dried, and compressed to prepare a positive electrode.

Using the positive electrode as a working electrode, and a lithium metal electrode as the counter electrode, a coin-type half-cell was fabricated in an Ar-purged glove box. For an electrolyte, 1 M $LiPF_6$ solution of ethylene carbonate and dimethyl carbonate (1:1 in the volume ratio) was used.

EXAMPLE 11

A coin-type cell was fabricated by the same manner as in Example 10, except that $LiNi_{0.9}Co_{0.1}Sr_{0.002}O_2$ powder with an average particle size of 5 μm was used instead of $Li_{1.03}Ni_{0.69}Mn_{0.19}Co_{0.1}Al_{0.07}Mg_{0.07}O_2$ powder. These powder particles were made of an agglomeration of smaller particles of an average particle size of 1 to 3 μm.

EXAMPLE 12

A coin-type cell was fabricated by the same manner as in Example 10, except that $LiMn_2O_4$ powder with an average particle size of 5 μm was used instead of $Li_{1.03}Ni_{0.69}Mn_{0.19}Co_{0.1}Al_{0.07}Mg_{0.07}O_2$ powder. These powder particles were made of an agglomeration of smaller particles of an average particle size of 1 to 3 μm.

EXAMPLE 13

5 g of Al-isopropoxide powder was dissolved in 95 g of ethanol to prepare 5% Al-isopropoxide solution (solution-preparing step).

The Al-isopropoxide solution and 50 g of $LiCoO_2$ powder were put into a mixer with a water-jacket heat exchanger and mixed thoroughly for about 10 minutes. Then, nitrogen gas was injected into the mixer while the mixer chamber temperature was kept at 60° C. by circulating hot water through the heat-exchanger. The mixture was stirred continuously for an additional 30 minutes while dry nitrogen gas was flowing continuously to evaporate ethanol. The resulting dry powder was coated uniformly with an Al-intermediate compound (one-shot process).

The fine powder was heat-treated at 600° C. under a flowing air (heat-treating process). The heat-treated powder was sieved to collect powder with a suitable size and use it as a positive active material.

EXAMPLE 14

1% of Al-isopropoxide was dissolved in 99% ethanol to prepare a 1% Al-isopropoxide ethanol solution. To the ethanol solution, $LiCoO_2$ with an average diameter of 10 $\mu$m was added. Then they were well mixed to sufficiently react the ethanol solution with $LiCoO_2$. The resulting material was separated from the solution and then dried at about 100° C. for about 12 hours in an oven to prepare a positive active material.

COMPARATIVE EXAMPLE 3

A coin-type cell was fabricated as in Example 7, except that $LiCoO_2$ powder having a single-grain structure with an average particle size of 10 $\mu$m was used. The $LiCoO_2$ powder was not coated with the boron ethoxide solution.

COMPARATIVE EXAMPLE 4

A coin-type cell was fabricated by the same manner as in Example 7, except that $Li_{1.03}Ni_{0.69}Mn_{0.19}Co_{0.1}Al_{0.07}Mg_{0.07}O_2$ powder having a single-grain structure having a 10 $\mu$m average particle size was used. The $Li_{1.03}Ni_{0.69}Mn_{0.19}Co_{0.1}Al_{0.07}Mg_{0.07}O_2$ powder was not coated with the boron ethoxide solution.

COMPARATIVE EXAMPLE 5

A coin-type cell was fabricated by the same manner as in Example 7, except that $LiNi_{0.9}Co_{0.1}Sr_{0.002}O_2$ powder having a single-grain structure with an average particle size of 10 $\mu$m was used. The $LiNi_{0.9}Co_{0.1}Sr_{0.002}O_2$ powder was not coated with the ethoxide solution.

COMPARATIVE EXAMPLE 6

A coin-type cell was fabricated by the same manner as in Example 7, except that $LiMn_2O_4$ powder having a single-grain structure with an average particle size of 20 $\mu$m was used. The $LiMn_2O_4$ powder was not coated with the ethoxide solution.

Discharge capacities of the coin-type cells according to Examples 7 to 12 and Comparative Examples 3 to 6 were measured. The positive active materials were charged and discharged between 4.3 V to 2.75 V, varying the charge and discharge rates (current density) in the sequence of 0.1 C (1 cycle), 0.2 C (3 cycles), 0.5 C (10 cycles), and 1 C (6 cycles).

Figure 5:
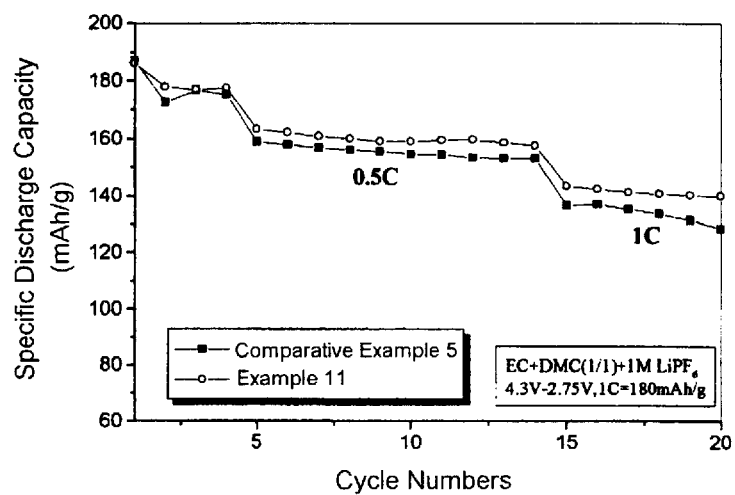
FIG. 5 is a graph showing the cycle life characteristics of coin-type cells respectively according to Example 11 of the present invention and Comparative Example 5.

Cycle life characteristics of cells according to Example 11 and Comparative Example 5 relative to cycle numbers are presented in FIG. 5. As shown in FIG. 5, the cycle life characteristics of the cell of Example 11 are better than those of the cell of Comparative Example 5.

DSC analysis is performed in order to confirm thermal safety of a charged positive active material. In order to be marketable, battery cells should pass various safety tests. The nail penetration test, in which a nail is passed through a charged battery cell, is critical for guaranteeing the safety of the battery. The safety of the battery depends on various factors, especially the exothermic reaction caused by reacting the charged positive electrode with electrolyte impregnated in the charged positive electrode.

For example, when a coin cell with a $LiCoO_2$ active material is charged to a pre-determined potential, $LiCoO_2$ is converted to $Li_{1-x}CoO_2$. The thermal safety of the charged positive active material $Li_{1-x}CoO_2$ was evaluated by measuring the temperature at which an exothermic peak occurs and the quantity of heat evolved from the DSC. Because the $Li_{1-x}CoO_2$ active material is unstable, oxygen bonded to cobalt (Co—O) decomposes and releases, when the battery temperature increases. The released oxygen may react with the electrolyte in a cell to cause the cell to burst or explode. Accordingly, the temperature and the quantity of heat evolved when oxygen is decomposed significantly affect the safety of the cell.

Figure 6:
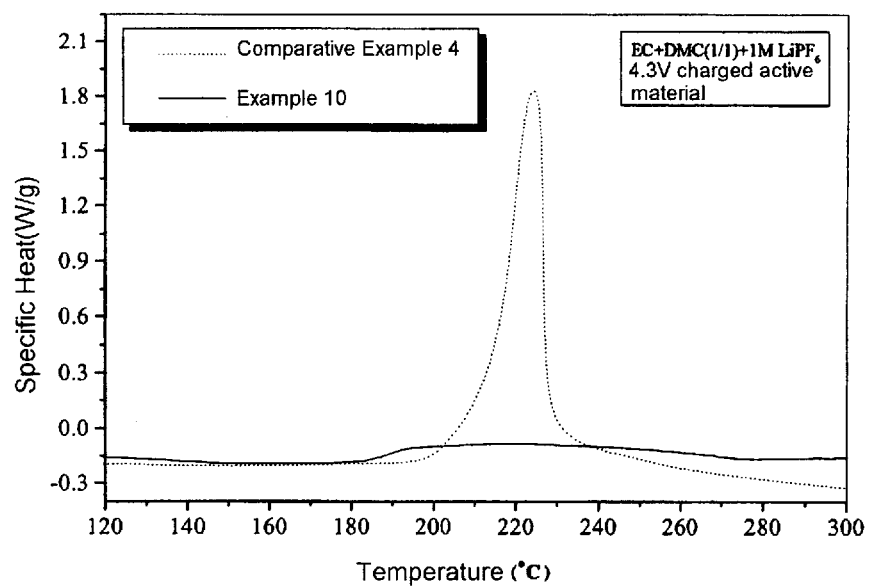
FIG. 6 is a graph illustrating the differential scanning calorimetry (DSC) results of positive materials respectively according to Example 10 of the present invention and Comparative Example 4.
Figure 7:
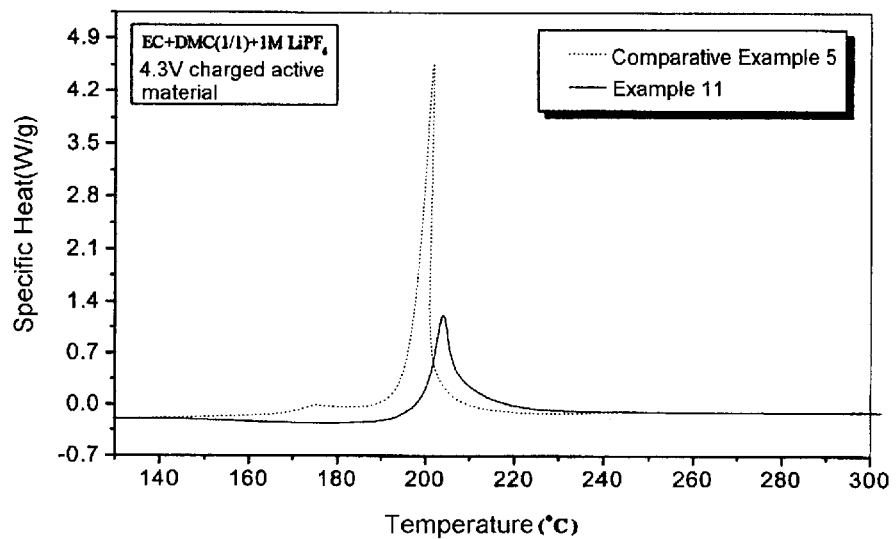
FIG. 7 is a graph illustrating the DSC results of positive materials respectively according to Example 11 of the present invention and Comparative Example 5.

The coin-type cells according to Examples 7 to 12 and Comparative Examples 3 to 6 were charged to 4.3 V. The positive electrode was separated from the coin-type cells, and 10 mg of the positive active material was collected from the electrode and DSC analysis was performed by scanning from 25 to 300° C., increasing the temperature at a rate of 3° C./min. The results are presented in FIGS. 6 and 7. FIG. 6 shows the DSC results according to Example 10 and Comparative Example 4. FIG. 7 shows the DSC results according to Example 11 and Comparative Example 5.

Figure 8:
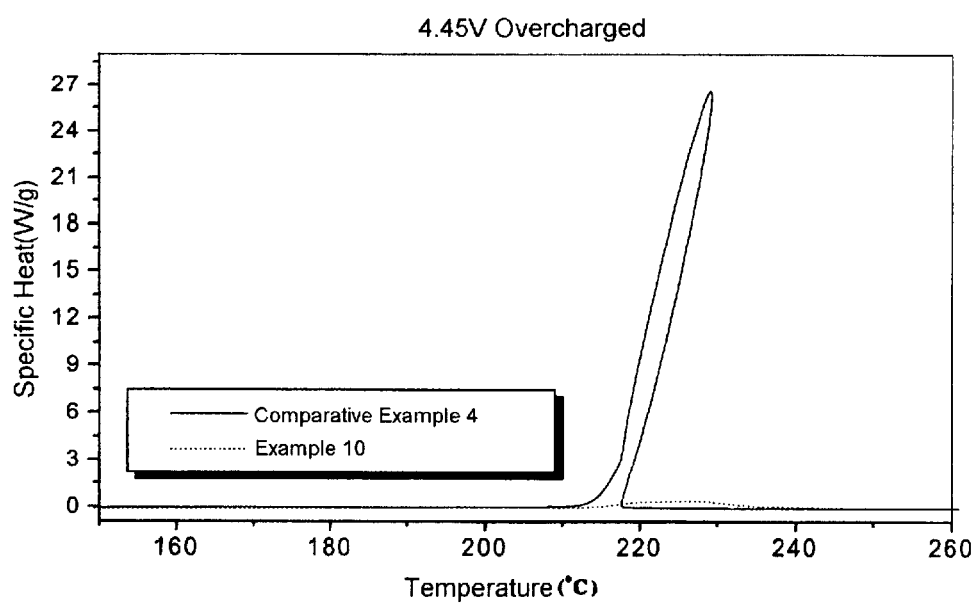
FIG. 8 is a graph illustrating the DSC results of overcharged positive materials respectively according to Example 10 of the present invention and Comparative Example 4.

The coin-type cells according to Examples 7 to 12 and Comparative Examples 3 to 6 were overcharged to 4.45 V. Positive active material was separated from the coin-type cells, and 10 mg of the positive active material was collected from the electrode. DSC analysis of this active material was performed by scanning from 25 to 300° C., increasing the temperature at a rate of 3° C./min. FIG. 8 shows the DSC results according to Example 10 and Comparative Example 4.

As shown in FIG. 6, the positive active material according to Comparative Example 4 has a sharp exothermic peak at about 220° C. On the other hand, the positive active material according to Example 10 has substantially no exothermic peak. Therefore, the positive active material of Example 10 has a much lower quantity of heat evolved than that of Comparative Example 4, showing that the positive active material of the present invention has better thermal safety. Similar results are shown in FIG. 7 for the DSC results according to Example 11 and Comparative Example 5. Especially in an overcharged condition, the thermal safety of Example 10 is surprisingly much more stable than Comparative Example 4, as shown in FIG. 8.

The positive active material of the present invention exhibits excellent discharge characteristics, much better power characteristics, and significantly longer cycle life than corresponding uncoated active material.

In addition, the positive active material of the present invention has a uniform particle size and a metal-oxide coating on it, giving an enhanced thermal safety for the battery cells containing the material.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A positive active material for a rechargeable lithium battery comprising:
   a core comprising a lithiated compound, the lithiated compound comprising a secondary particle having an average size larger than or equal to 1 μm and smaller than 10 μm in diameter, the secondary particle being formed of an agglomeration of small primary particles of an average size of 1 to 3 μm in diameter; and
   a surface-treatment layer on the core, the surface-treatment layer comprising a coating-element-included oxide, a coating-element-included hydroxide, oxyhydroxide, oxycarbonate, hydroxycarbonate or a mixture thereof.

2. The positive active material according to claim 1, wherein the lithiated compound is at least one compound selected from the group consisting of compounds represented by the formulas 1 to 11:

$$Li_xMn_{1-y}M'_yA_2 \quad (1)$$

$$Li_xMn_{1-y}M'_yO_{2-z}X_z \quad (2)$$

$$Li_xMn_2O_{4-z}A_z \quad (3)$$

$$Li_xMn_{2-y}M'_yA_4 \quad (4)$$

$$Li_xM_{1-y}M''_yA_2 \quad (5)$$

$$Li_xMO_{2-z}A_z \quad (6)$$

$$Li_xNi_{1-y}Co_yO_{2-z}A_z \quad (7)$$

$$Li_xNi_{1-y-z}Co_yM''_zA_\alpha \quad (8)$$

$$Li_xNi_{1-y-z}Co_yM''_zO_{2-\alpha}X_\alpha \quad (9)$$

$$Li_xNi_{1-y-z}Mn_yM'_zA_\alpha \quad (10)$$

$$Li_xNi_{1-y-z}Mn_yM'_zO_{2-\alpha}X_\alpha \quad (11)$$

wherein:
$0.95 \leq x \leq 1.1, 0 \leq y \leq 0.5, 0 \leq z \leq 0.5, 0, \alpha \leq 2$,
M is Ni or Co,
M' is at least one element selected from the group consisting of Al, Ni, Co, Cr, Fe, Mg, Sr, V, Sc, Y, La, Ce, Pr, Nd, Pm, Sm, Eu, Gd, Tb, Dy, Ho, Er, Tm, Yb, Lu, Ac, Th, and Pa,
M" is at least one element selected from the group consisting of Al, Cr, Mn, Fe, Mg, Sr, V, Sc, Y, La, Ce, Pr, Nd, Pm, Sm, Eu, Gd, Tb, Dy, Ho, Er, Tm, Yb, Lu, Ac, Th, and Pa,
A is selected from the group consisting of O, F, S and P, and
X is selected from the group consisting of F, S and P.

3. The positive active material according to claim 1, wherein the coating element is selected from the group consisting of Mg, Al, Co, K, Na, Ca, Si, Ti, V, Ge, Ga, B, As, and Zr.

4. The positive active material according to claim 1, wherein the content of the coating element of the surface-treatment layer is $2 \times 10^{-5}$ to 1 wt % based on the weight of positive active material.

5. The positive active material according to claim 4, wherein the content of the coating element of the surface-treatment layer is 0.001 to 1 wt % based on the weight of the positive active material.

6. A method of preparing a positive active material for a rechargeable lithium battery comprising:

coating a lithiated compound with an organic solution or aqueous solution including a coating-element source, the lithiated compound comprising a secondary particle with an average particle size larger than or equal to 1 μm and smaller than 10 μm in diameter, the secondary particle being formed of an agglomeration of small primary particles having an average particle size of 1 to 3 μm in diameter; and
   heat-treating the coated lithiated compound.

7. The method according to claim 6, wherein the lithiated compound is at least one compound selected from the group consisting of compounds represented by the formulas 1 to 11:

$$Li_xMn_{1-y}M'_yA_2 \quad (1)$$

$$Li_xMn_{1-y}M'_yO_{2-z}X_z \quad (2)$$

$$Li_xMn_2O_{4-z}A_z \quad (3)$$

$$Li_xMn_{2-y}M'_yA_4 \quad (4)$$

$$Li_xM_{1-y}M''_yA_2 \quad (5)$$

$$Li_xMO_{2-z}A_z \quad (6)$$

$$Li_xNi_{1-y}Co_yO_{2-z}A_z \quad (7)$$

$$Li_xNi_{1-y-z}Co_yM''_zA_\alpha \quad (8)$$

$$Li_xNi_{1-y-z}Co_yM''_zO_{2-\alpha}X_\alpha \quad (9)$$

$$Li_xNi_{1-y-z}Mn_yM'_zA_\alpha \quad (10)$$

$$Li_xNi_{1-y-z}Mn_yM'_zO_{2-\alpha}X_\alpha \quad (11)$$

wherein:
$0.95 \leq x \leq 1.1, 0 \leq y \leq 0.5, 0 \leq z \leq 0.5, 0, \alpha \leq 2$,
M is Ni or Co,
M' is at least one element selected from the group consisting of Al, Ni, Co, Cr, Fe, Mg, Sr, V, Sc, Y, La, Ce, Pr, Nd, Pm, Sm, Eu, Gd, Tb, Dy, Ho, Er, Tm, Yb, Lu, Ac, Th, and Pa,
M" is at least one element selected from the group consisting of Al, Cr, Mn, Fe, Mg, Sr, V, Sc, Y, La, Ce, Pr, Nd, Pm, Sm, Eu, Gd, Tb, Dy, Ho, Er, Tm, Yb, Lu, Ac, Th, and Pa,
A is selected from the group consisting of O, F, S and P, and
X is selected from the group consisting of F, S, and P.

8. The method according to claim 6, wherein the concentration of the coating element source in the organic solution or the aqueous solution ranges from 0.1 to 50 wt %.

9. The method according to claim 8, wherein the concentration of the coating element source in the organic solution or the aqueous solution ranges from 1 to 20 wt %.

10. The method according to claim 6, wherein the heat-treating is performed at a temperature ranging from 300 to 800° C. for 1 to 15 hours.

11. The method of claim 6, wherein the coating step is performed by injecting the lithiated compound and the organic solution or the aqueous solution including the coating-element source into a mixer and continuously increasing the temperature within the mixer.

12. A positive active material for a rechargeable lithium battery comprising:
   a core comprising a lithium-cobalt chalcogenide compound, the lithium-cobalt chalcogenide compound comprising a secondary particle having an average size larger than or equal to 1 μm and smaller than 10 μm in diameter, the secondary particle being formed of an agglomeration of small primary particles of an average size of 1 to 3 μm in diameter; and a surface-treatment layer formed on the core, the surface-treatment layer including one compound selected from the group consisting of $Al_2O_3$, $Al(OH)_3$, $AlO(OH)$, and mixtures thereof.

13. The positive active material according to claim 12, wherein the content of the Al of the surface-treatment layer is $2\times10^{-5}$ to 1 wt % based on the weight of positive active material.

14. The positive active material according to claim 12, wherein the content of the Al of the surface-treatment layer is 0.001 to 1 wt % based on the weight of positive active material.

15. A positive active material for a rechargeable lithium battery comprising:

a core comprising a lithium-manganese or lithium-cobalt chalcogenide compound, the lithium-manganese or lithium-cobalt chalcogenide compound comprising a secondary particle having an average size larger than or equal to 1 μm and smaller than 10 μm in diameter, the secondary particle being formed of an agglomeration of small primary particles of an average size of 1 to 3 μm in diameter; and a surface-treatment layer on the core, the surface-treatment layer comprising a B-included oxide or $HB(OH)_2$ on the core.

16. The positive active material according to claim 15, wherein the content of the B of the surface-treatment layer is $2\times10^{-5}$ to 1 wt % based on the weight of positive active material.

17. The positive active material according to claim 16, wherein the content of the B of the surface-treatment layer is 0.001 to 1 wt % based on the weight of positive active material.

* * * * *